US010997482B2

(12) United States Patent
Webster

(10) Patent No.: US 10,997,482 B2
(45) Date of Patent: *May 4, 2021

(54) TWO-DIMENSIONAL CRYPTOGRAPHIC POLY-CHROMATIC POLY-DIGITAL CODE

(71) Applicant: Caleb J. Webster, Monterey, CA (US)

(72) Inventor: Caleb J. Webster, Monterey, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/987,584

(22) Filed: Aug. 7, 2020

(65) Prior Publication Data

US 2020/0364524 A1    Nov. 19, 2020

Related U.S. Application Data

(63) Continuation of application No. 16/144,269, filed on Sep. 27, 2018, now Pat. No. 10,740,666.

(51) Int. Cl.
*G06K 19/06* (2006.01)
*G06K 7/14* (2006.01)

(52) U.S. Cl.
CPC ....... *G06K 19/0614* (2013.01); *G06K 7/1417* (2013.01); *G06K 19/06037* (2013.01); *G06K 19/06056* (2013.01)

(58) Field of Classification Search
CPC ............ G06K 1/123; G06K 7/10; G06K 7/14; G06K 19/06
USPC .................. 235/469, 375, 454, 462.04, 439
See application file for complete search history.

(56) References Cited

U.S. PATENT DOCUMENTS

| 7,020,327 B2 | 3/2006 | Tack-Don et al. |
| 7,032,823 B2 | 4/2006 | Nojiri |
| 8,511,562 B2 | 8/2013 | Onoda |
| 8,670,168 B1 | 3/2014 | Harrison |
| 8,973,843 B2 | 3/2015 | Vans |
| 9,111,186 B2 | 8/2015 | Blasinski et al. |

(Continued)

FOREIGN PATENT DOCUMENTS

| CN | 104794518 | 9/2011 |
| FR | 3054707 | 2/2018 |

(Continued)

OTHER PUBLICATIONS

M. Querini, A. Grillo, A. Lentini and G.F. Italiano, 2D Color Barcodes for Mobile Phones ,International Journal of Computer Science and Applications, Technomathematics Research Foundation vol. 8 No. 1, pp. 136-155, 2011, Published 2011.

(Continued)

*Primary Examiner* — Edwyn Labaze
(74) *Attorney, Agent, or Firm* — Cozen O'Connor

(57) ABSTRACT

A system and method employing two-dimensional, cryptographic, poly-chromatic, poly-digital codes ("polycodes") that may be employed in connection with various digital transactions and communications applications are disclosed. In some implementations, a polycode may generally comprise a plurality of discrete code cells arranged in a two-dimensional matrix, each of the plurality of code cells displaying a combination of zero or more pure chromatic inputs representing an encoded integer; the number of possible combinations of pure chromatic inputs is equal to the number of possible integer values such that a discrete combination of pure chromatic inputs is unique to a discrete integer that is used in the polycode.

10 Claims, 9 Drawing Sheets

(56) References Cited

U.S. PATENT DOCUMENTS

| | | | |
|---|---|---|---|
| 9,311,584 B2 | 4/2016 | Al-Omari et al. | |
| 9,805,296 B2 | 10/2017 | Loy et al. | |
| 2006/0282500 A1* | 12/2006 | Kiuchi | H04L 63/08 709/203 |
| 2009/0242649 A1* | 10/2009 | Mizukoshi | G06K 19/06037 235/494 |
| 2010/0163629 A1* | 7/2010 | Rhoads | H04N 1/32203 235/487 |
| 2010/0246984 A1* | 9/2010 | Cheong | G06T 1/005 382/233 |
| 2012/0039529 A1* | 2/2012 | Rujan | G06K 19/06037 382/164 |
| 2012/0175419 A1* | 7/2012 | O'Keefe | G06K 19/06037 235/437 |
| 2013/0186957 A1* | 7/2013 | Endo | G06K 7/1491 235/469 |
| 2014/0103123 A1* | 4/2014 | McKinney, Jr. | G06K 19/06037 235/494 |
| 2015/0169928 A1* | 6/2015 | Soborski | G06K 19/086 235/375 |
| 2016/0092760 A1* | 3/2016 | Tanaka | G06K 19/06037 382/180 |
| 2016/0253584 A1* | 9/2016 | Fodor | C12Q 1/6853 235/494 |
| 2016/0373735 A1 | 12/2016 | Binti Abdul Hamid et al. | |
| 2017/0046606 A1* | 2/2017 | Hosokane | G06K 19/06131 |
| 2017/0076191 A1 | 3/2017 | Feng | |
| 2017/0103293 A1* | 4/2017 | Pic | G06K 19/06037 |
| 2017/0323187 A1* | 11/2017 | Ardo | H04M 1/72522 |

FOREIGN PATENT DOCUMENTS

| | | |
|---|---|---|
| JP | 2010282530 | 12/2010 |
| WO | 2008064644 | 6/2008 |
| WO | 2011108605 | 9/2011 |

OTHER PUBLICATIONS

Alexander D. Wissner-Grossa, Timothy M. Sullivan, Multicolor symbology for remotely scannable 2D barcodes, International Symposium on Photoelectronic Detection and Imaging 2007: Image Processing, edited by Liwei Zhou, Proc. of SPIE vol. 6623, 662304, (2008) • 0277-786X/08/$18 • doi: 10.1117/12.791268, Published 2008.

Zhibo Yang, Huanle Xu, Member, Jianyuan Deng, "Robust and Fast Decoding of High-Capacity ColorQR Codes for Mobile Applications", IEEE Transactions on Image Processing, Published May 19, 2018.

Henryk Blasinski, Student Member, Orhan Bulan, and Gaurav Sharma, "Per-Colorant-Channel Color Barcodes for Mobile Applications: An Interference Cancellation", IEEE Transactions on Image Processing, vol. 22, No. 4, Published Apr. 2013.

* cited by examiner

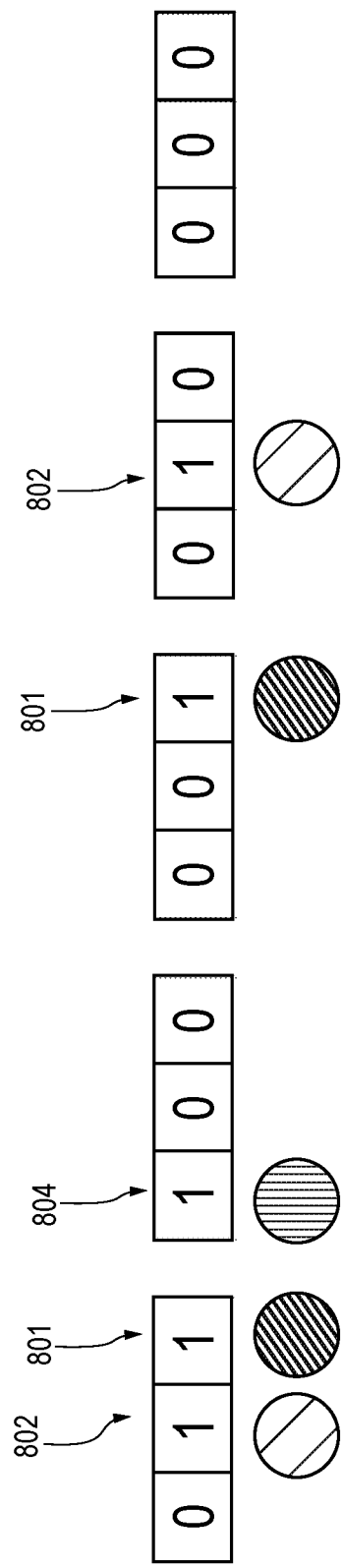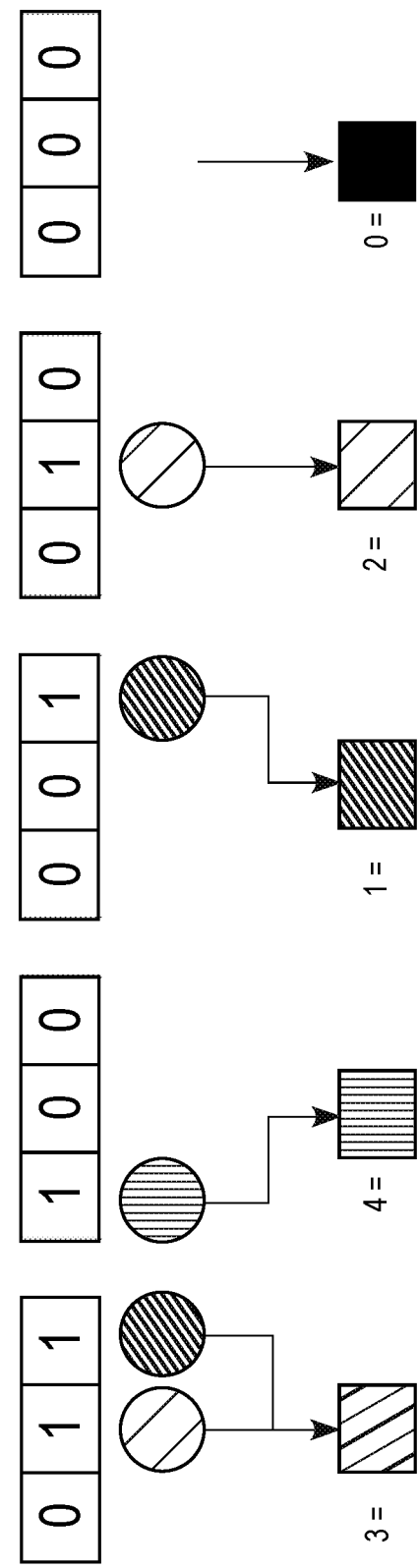

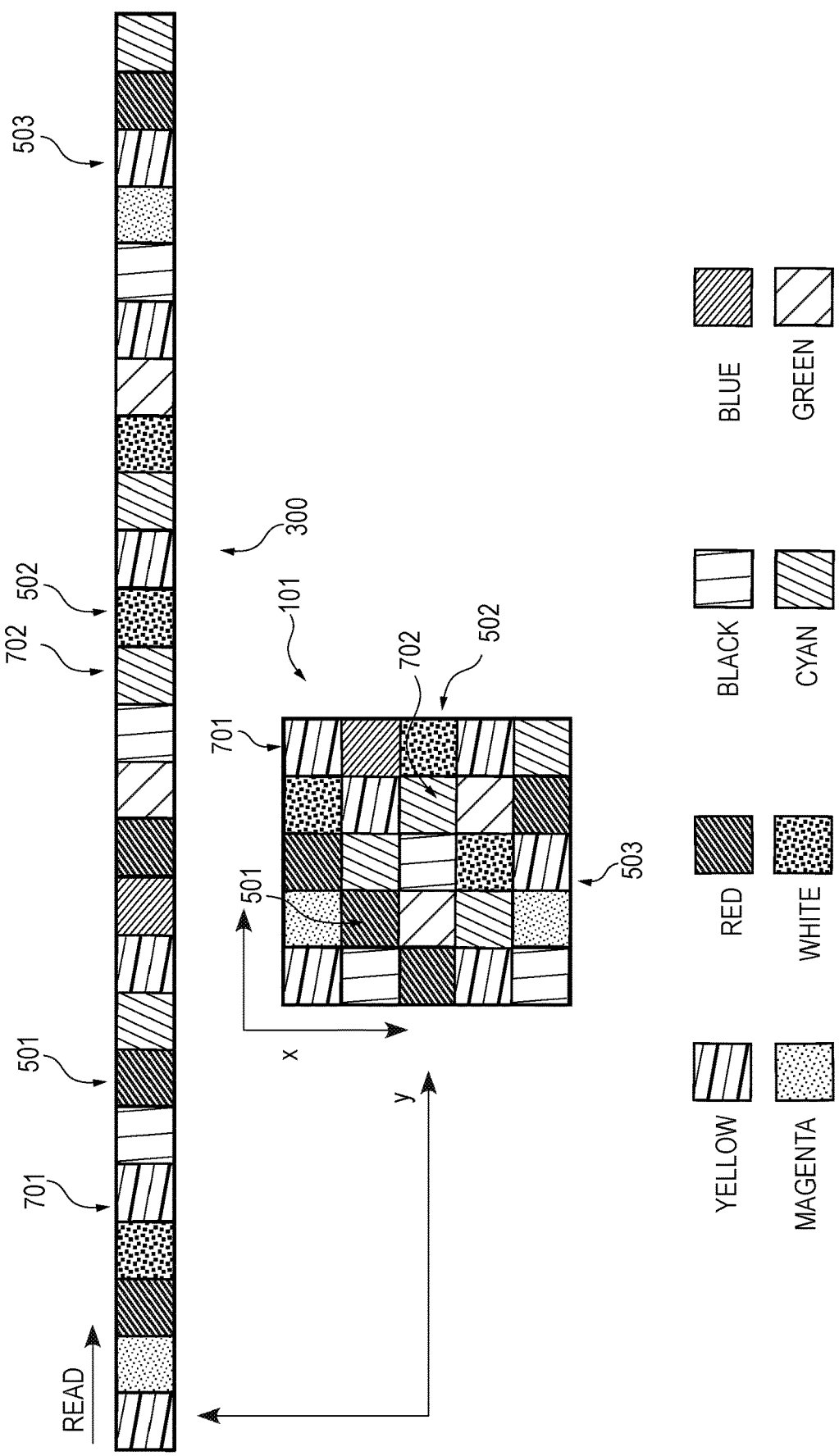

TWO-DIMENSIONAL CRYPTOGRAPHIC POLY-CHROMATIC POLY-DIGITAL CODE

CROSS-REFERENCE TO RELATED APPLICATION

This application is a continuation of pending U.S. patent application Ser. No. 16/144,269, filed Sep. 27, 2018, the disclosure of which is hereby incorporated herein by reference in its entirety.

FIELD OF THE DISCLOSURE

Aspects of the disclosed subject matter relate generally to visually or optically viewable two-dimensional codes, and more particularly to a system and method employing two-dimensional, cryptographic, poly-chromatic, poly-digital codes in connection with various digital transactions and communications applications.

BACKGROUND

Quick Response (or "QR") codes have been gaining popularity since the 1990s as a convenient mechanism, among other things, to identify goods and services (see, Optically Readable Two-Dimensional Code And Method And Apparatus Using The Same (U.S. Pat. No. 5,726,435)), while bar codes have been ubiquitous since the 1950s. Typical QR codes employ monochromatic cells arranged in a two dimensional grid, the orientation of which may be determined by the relative locations of "positioning symbols" which are themselves visually distinct from the operative cells in the code. A typical bar code or Universal Product Code (UPC), on the other hand, consists of a series of substantially equal length, parallel, monochromatic bars, arranged side by side such that the code may be detected by a scanning device and read in a linear fashion.

In the case of both barcodes and QR codes, the code is typically associated with a good or service, the identification of which may be effectuated by optically viewing (i.e., scanning or reading) the code with a reader device, which sends acquired data to a processing device or system that parses the code and effectuates the identification of the associated good or service. In both instances, the code is monochromic (i.e., a readable space within the code is read as either black or white) or binary (i.e., black=0 and white=1, or vice versa). While this facilitates use of fairly unsophisticated reader apparatus, the binary nature of the codes presents significant limitations with respect to the sophistication of the codes themselves.

Further, most conventional prior art systems are designed for active scanning; in a typical implementation, a code must be illuminated by a scanning device—usually a coherent, single-wavelength or tuned laser. In particular, barcodes and QR codes are, by design, intended to work in situations where it is necessary that the cooperating scanner is tuned to the frequency and phase of the illumination used to view or scan the code. Recently, some systems have been developed that attempt to use other scanner types (such as smart phone cameras, for instance) to overcome this limitation. In operation, some prior art systems may read barcodes and QR codes passively (e.g., taking a photo using environmental illumination) or actively with fewer restrictions (e.g., a flash which is neither coherent nor single-frequency), but the existing art is still deficient in this regard.

Therefore, there is a need for an improved system and method employing two-dimensional, cryptographic, poly-chromatic, poly-digital codes in connection with various digital transactions and communications applications. In some implementations, such a polycode may have no need for controlled, active illumination.

SUMMARY OF THE DISCLOSURE

The following presents a simplified summary of the disclosure in order to provide a basic understanding of some aspects of various embodiments disclosed herein. This summary is not an extensive overview of the disclosure. It is intended neither to identify key or critical elements of the disclosed embodiments nor to delineate the scope of those embodiments. Its sole purpose is to present some concepts of the invention in a simplified form as a prelude to the more detailed description that is presented later.

The present disclosure describes a system and method employing two-dimensional, poly-chromatic, poly-digital codes in connection with various digital transactions and communications applications; in the context of this description, such a code is referred to as a "polycode." In some implementations, polycode may be implemented as an arrangement of colored pixels (or "cells") that are either printed on a tangible medium (such as packaging material, signage, coupons, airline boarding passes, theater or other venue tickets, other articles of manufacture, and the like) or displayed electronically (such as on a wireless telephone or tablet display, for instance) for similar or different applications as a printed or tangible version. Specific use cases are discussed in detail below, but it is worth noting here that the present disclosure is not intended to be limited by any particular use or application of polycode. In short, the polycode stands for, or represents, an encrypted sequence of poly-digital integers; in the context of the present disclosure, the term "poly-digital" will be understood to mean that the encrypted or encoded integers are more than binary. Examples of poly-digital include trinary, octal, decimal, hexadecimal, etc.

In accordance with one embodiment, for example, a polycode data structure may generally comprise a plurality of discrete code cells arranged in a two-dimensional matrix, each of the plurality of code cells displaying a combination of zero or more pure chromatic inputs representing an encoded integer, wherein a number of possible combinations of pure chromatic inputs is equal to a number of possible integer values such that a discrete combination of pure chromatic inputs is unique to a discrete integer that is used in the polycode. Such a polycode data structure may further comprise a non-code cell positioned in a known location within the matrix. The polycode data structure may be implemented such that the non-code cell is an orientation cell that establishes a principal orientation of the matrix, or the non-code cell is a validation cell that establishes that the polycode is not corrupted. In one illustrated implementation, a polycode data structure may utilize one or more orientation cells and one or more validation cells in a single matrix.

As set forth below, in accordance with the disclosed subject matter, a polycode data structure may employ a matrix that is a regular polygon; alternatively, a polycode data structure may employ a matrix that is a circle. Other shapes are described below.

In use of a polycode data structure, the matrix may be disposed on or affixed to an article of manufacture or presented (such as electronically, for instance) on a display. In some situations, the matrix may be associated with metadata. In accordance with some disclosed implementations, the metadata may be representative of information related to a good or service.

In accordance with another aspect of the disclosed subject matter, a method of constructing a polycode data structure may generally comprise: generating a unique code string of integer values using a code base that is greater than a binary base, each integer value representing a code cell; for each code cell: translating the integer value to a binary base to create a binary value having binary digits; translating each binary digit to a pure chroma value based upon a mapping; generating a mixed-chroma value based upon a combination of the pure chroma value for each binary digit; and assigning the mixed-chroma value to the code cell; and assembling the code cells into a two-dimensional matrix wherein each code cell is represented in accordance with the assigning.

Methods are disclosed wherein the mapping uses an RGB color paradigm; additional or alternative methods are disclosed wherein the mapping uses a CYMK color paradigm. Some methods may further comprise associating the unique code string of integer values with metadata to be represented by the polycode data structure. In use, such methods may further comprise displaying the matrix for a detection device; the displaying may generally comprise affixing the matrix on an article of manufacture, presenting the matrix on a display, or both.

In accordance with yet another aspect of the disclosed subject matter, a method of reconstructing a numerical string encoded in a polycode data structure may generally comprise: acquiring a polycode matrix; scanning the polycode matrix to identify cells including an orientation cell and code cells; responsive to the scanning, identifying a location of the orientation cell to determine an order to parse the matrix to identify code cells; for each code cell: detecting a mixed-chroma value; translating the mixed-chroma value to a combination of zero or more pure chroma values, each of the zero or more pure chroma values representing a binary digit; generating a binary string based upon the combination and a mapping of pure chroma values to binary digits; responsive to the generating, identifying a binary value for the code cell; and translating the binary value to a numerical value based upon a code base; and reconstructing the numerical string based upon the numerical value for each code cell.

Similarly, a method of reconstructing a numerical string encoded in a polycode data structure may generally comprise: acquiring a polycode matrix; scanning the polycode matrix to identify cells including an orientation cell and code cells; responsive to the scanning, identifying a location of the orientation cell to determine an order to parse the matrix to identify code cells; for each code cell: detecting a whether a pure chroma value is displayed; based on the detecting, identifying a combination of zero or more pure chroma values displayed in the cell, each of the zero or more pure chroma values representing a binary digit; generating a binary string based upon the combination and a mapping of pure chroma values to binary digits; responsive to the generating, identifying a binary value for the code cell; and translating the binary value to a numerical value based upon a code base; and reconstructing the numerical string based upon the numerical value for each code cell.

As noted above with reference other implementations, the mapping may use an RGB color paradigm or a CYMK color paradigm. Disclosed methods may further identify metadata associated with the numerical string.

The foregoing and other aspects of various disclosed embodiments will be apparent through examination of the following detailed description thereof in conjunction with the accompanying drawing figures, in which like reference numerals are used to represent like components throughout, unless otherwise noted.

DESCRIPTION OF THE DRAWING FIGURES

FIG. 8 is a diagram illustrating one embodiment of translating octal values to binary values and translating those binary values to pure chroma values;

FIG. 9 is a diagram illustrating one embodiment of translating the pure chroma values in FIG. 8 to polychromatic (or mixed-chroma) values;

FIG. 10 is a diagram illustrating one embodiment of creating a two-dimensional polycode from a string of mixed-chroma values;

DETAILED DESCRIPTION

Figure 1:
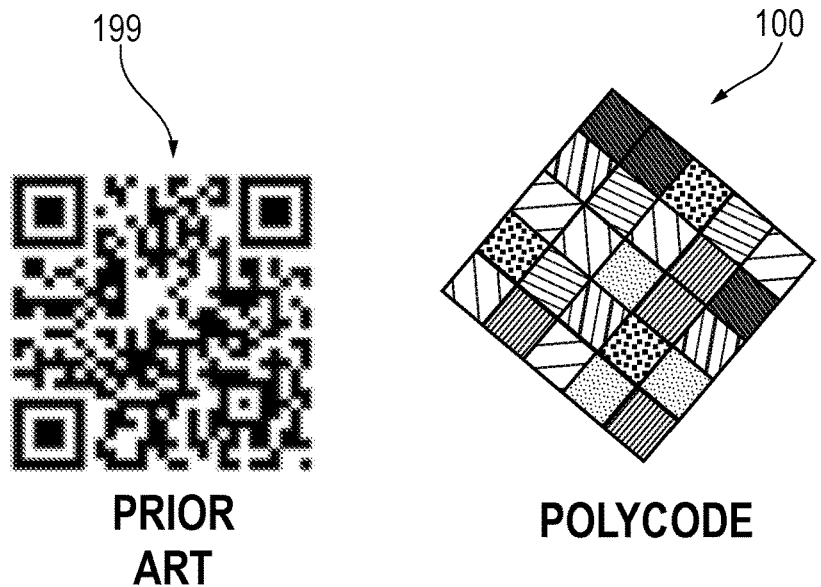
FIG. 1 illustrates an implementation of polycode side by side with an embodiment of a Quick Response ("QR") code.

Certain aspects and features of the disclosed subject matter may be further understood with reference to the following description and the appended drawing figures. In operation, a system and method employing two-dimensional, poly-chromatic, poly-digital codes may be employed in connection with various digital transactions and communications applications. Specifically, the present disclosure provides for a two-dimensional polycode that may generally comprise: one or more discrete cells, each of which may display a combination of zero or more pure chromatic inputs, wherein each cell represents an encoded integer, and wherein a number of possible integer values (for a cell in the code) is equal to a number of possible combinations of pure chromatic inputs.

In some instances, the individual cells in the polycode comprise one or more code cells (i.e., cells that represent the encoding of a series of integers as set forth below) as well as one or more orientation cells. In this context, it will be appreciated that the term "cell" is intended to encompass an area or region in two-dimensional space that may be printed or displayed (in the case of constructing, displaying, or presenting the polycode), on the one hand, and identified or otherwise distinguished from adjacent or neighboring areas or regions in space (in the case of scanning or reading the polycode), on the other hand. In operation (i.e., in particular, during operations involving scanning or reading the polycode), such orientation cells may display a predetermined or otherwise specific chromatically coded value (or plurality of values), and may be positioned in a known or readily identifiable location such that the intended orientation of the polycode (vis-à-vis a scanner or detection or reader device) may be determined; it will be appreciated that employing more than one orientation cell in a given polycode configuration may facilitate determination of the polycode's orientation irrespective of the perspective or angle from which the polycode is scanned or read.

Additionally or alternatively, the polycode may comprise one or more validation cells (as used herein, both validation cells and orientation cells may be referred to as "non-code" cells); in some implementations, the validation cells may be positioned in known or readily ascertainable locations within the polycode and may be created in such a manner as to have a predetermined relationship with or orientation with respect to one or more code cells.

It will be appreciated that other code types may employ "non-data" cells of a sort. For instance, timing cells are typically inserted in QR codes (in three of the corners). Polycode, however, has no "non-data" cells, although some of the data cells (such as validation cells and orientation cells) are "non-code" cells. In particular, as compared to simple observation of a QR code, it is not possible to discern which cells are non-code cells without a priori knowledge of the polycode, which renders polycode much more difficult to falsify or to "hack" than other codes.

As set forth in more detail below, displayed polycode may be scanned or read by a reading device or apparatus; in the context of the present disclosure, the terms "read," "scan," "view," "optically view," and the like, are intended to convey that the polycode may be detected by a suitable detection apparatus such as a polychromatic scanner, a color still or video camera, optical and other detection technologies that are capable of observing, detecting, and (in some instances) recording electromagnetic energy in the portion of the spectrum that is generally visible to the human eye. It will be appreciated that various touch screen or other display apparatus and cameras currently employed in portable devices such as wireless telephones and tablet computers may be capable of displaying, reading, scanning, viewing, or otherwise optically detecting the disclosed polycode embodiments. It is also noted that typical computer and portable device displays, as well as typical cameras and other detection apparatus, currently deployed in similar art fields are capable of displaying (on the one hand) as well as detecting (on the other hand) many more colors and subtle color combinations and variations than a human eye can distinguish. The present disclosure is not intended to be limited by the operational characteristics and technical limitations of current display and optical detection technologies.

It will be appreciated that polycode may be used to represent, for example, numerical data, a link to a specific location within or to particular data resident on an interconnected digital computing environment such as the Internet or an intranet, and (similar in some respects to a barcode) merchandise, goods, services, or records related to the foregoing as well as rights pertaining to the applicable merchandise, good, or service, either in the physical world or in a virtual reality such as the Internet (or "cyberspace").

Figure 2:
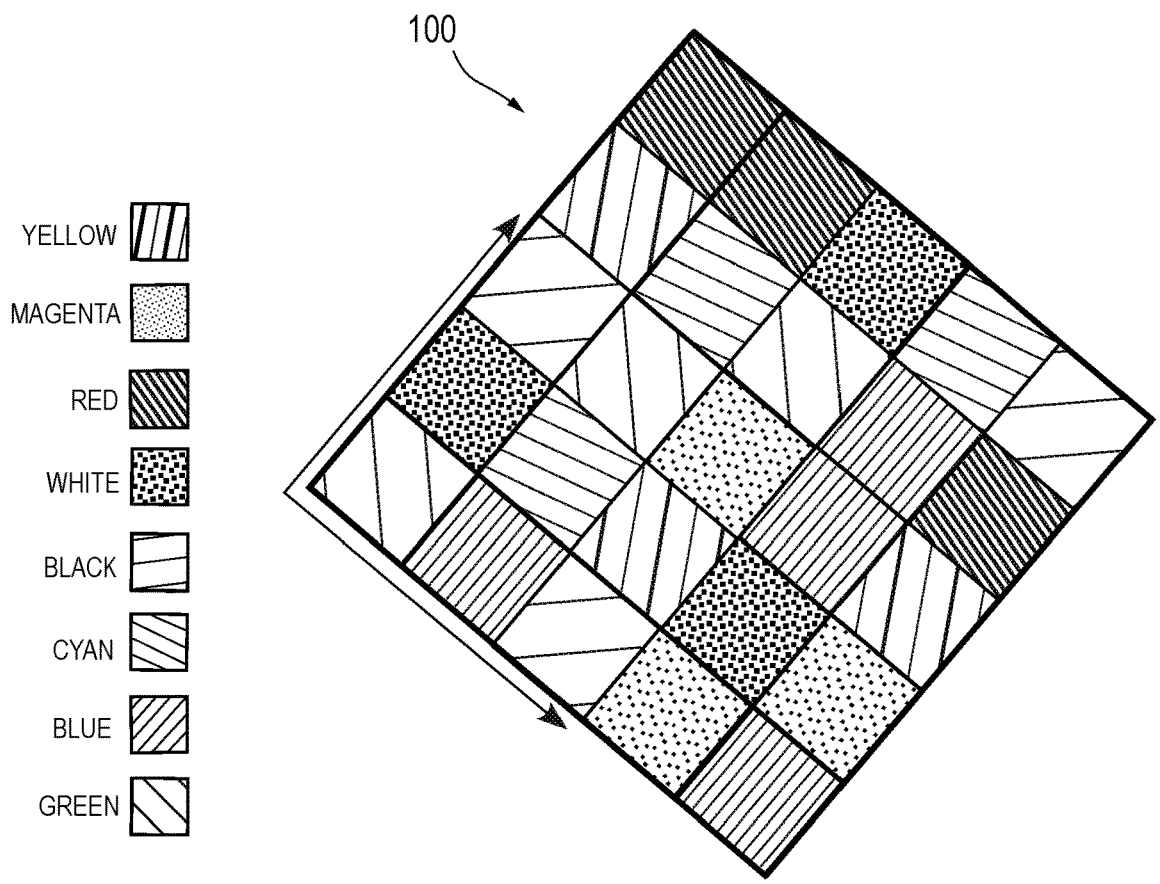
FIG. 2 illustrates a larger view of the polycode implementation of FIG. 1.

Turning now to the drawing figures, FIG. 1 illustrates an implementation of polycode side by side with an embodiment of a Quick Response ("QR") code, and FIG. 2 illustrates a larger view of the polycode implementation of FIG. 1.

FIG. 1 depicts the sharp distinction between polycode 100, on the right side, and the prior art QR code 199, on the left side. As is evident from the illustration, QR code 199 uses a great number of "code cells" that actually encode data, and a smaller number (in the illustrated example, only three) of "positioning symbols" or timing signal (at the top right and left, and at the lower left, of the example QR code 199) that are non-data cells. While fewer in number than the code cells, the positioning symbols actually comprise a great amount of printed area of the QR code that could otherwise be used for the code itself. These distinct positioning symbols make QR code 199 easier to read by an unsophisticated reader, but they also render QR code 199 easier to replicate and easier to compromise. Additionally, the number of code cells may limit the types of readers or other detection apparatus that may be used with QR code 199. By way of comparison, polycode 100 illustrated on the right of FIG. 1 uses relatively fewer, relatively larger cells as compared to QR code 199, without sacrificing code integrity or operational utility. In particular, polycode implementations as set forth herein may use pre-determined non-code cells (e.g., to establish orientation, validation, or both) that are visually indistinguishable from the code cells themselves; i.e., it is not possible from casual observation to determine which cells display code content and which cells are non-code cells without information regarding how they polycode was constructed in the first place.

As illustrated in FIGS. 1 and 2, one embodiment of polycode 100 may employ a square arrangement having five cells per side (y=0, 1, 2, 3, 4; x=0, 1, 2, 3, 4). By way of example, in FIGS. 1 and 2, where y=0, the polychromatic displays for x=0, 1, 2, 3, 4 are, respectively: green; blue; black; magenta; and blue. Similarly, where y=1, the polychromatic displays for x=0, 1, 2, 3, 4 are, respectively: white; cyan; yellow; white; and magenta. Those of skill in the art will appreciate that polycode 100 constructed and operative in accordance with the disclosed subject matter may be larger or smaller (in one or both dimensions) than the illustrated matrix, depending upon, among other things, desired code density, the sensitivity of the material being encoded, practical applications, the nature and operational characteristics of the reader or scanner with which the code is intended to be used, or a combination of these and a variety of other factors and design choices generally known in the art.

Figure 3:
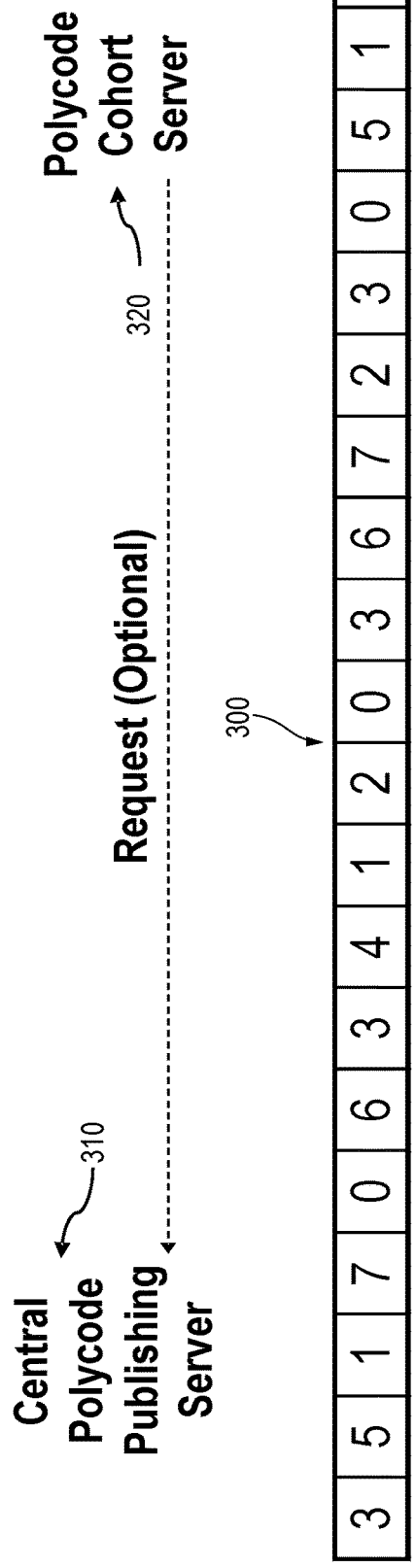
FIG. 3 is a diagram illustrating a 20-digit octal string.
Figure 4:
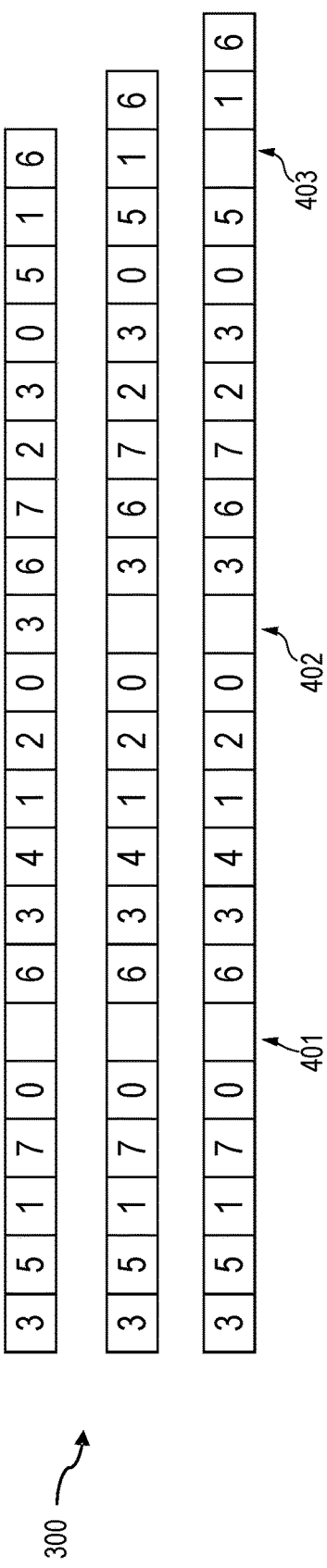
FIG. 4 is a diagram illustrating the string of FIG. 3 with positions added for validation cells.
Figure 5:
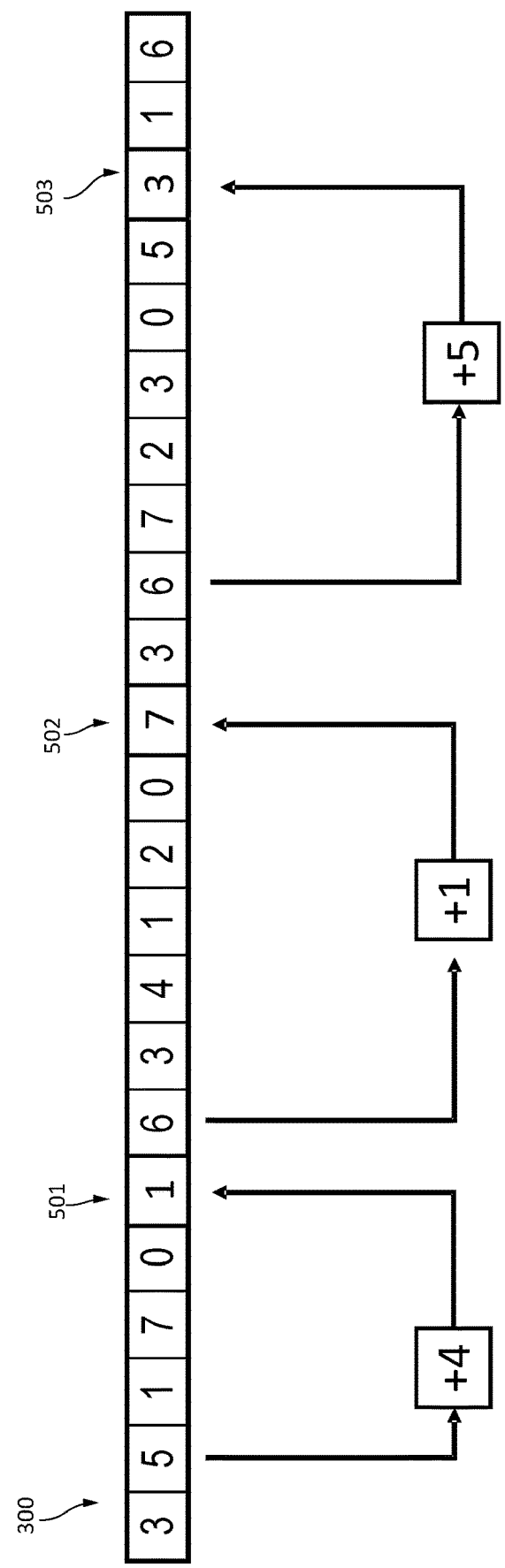
FIG. 5 is a diagram illustrating the string of FIG. 4 with values added for the validation cells.

Turning now to one specific example of generating a polycode, FIG. 3 is a diagram illustrating a 20-digit octal string, FIG. 4 is a diagram illustrating the string of FIG. 3 with positions added for validation cells, and FIG. 5 is a diagram illustrating the string of FIG. 4 with values added for the validation cells. It is noted that 20-digit octal string 300 is illustrated by way of example only, and not by way of limitation. Other encoding schemes may readily be employed given the scope and contemplation of the present disclosure. In particular, decimal strings, hex strings, and hexadecimal strings, as well as strings shorter or longer than 20 numerals, may be utilized as desired or as functional requirements or other operational characteristics dictate. For simplicity, the illustrated implementation uses 20-digit octal string 300, but it will be appreciated that the disclosed subject matter is susceptible of numerous alterations and modifications.

As indicated in FIG. 3, a 20-digit octal string 300 may be generated; integer positions are indicated progressing horizontally from left to right in FIG. 3. In some instances, such as depicted in FIG. 3, string 300 may be generated by a central polycode publishing server 310, either at the behest or request, directly or indirectly, of a polycode cohort server 320, or possibly independently (i.e., unbidden by cohort server 320). While embodiments of servers 310 and 320 are addressed in more detail below, the disclosed subject matter is not intended to be limited by the architecture or operational characteristics of servers 310 and 320; those of skill in the art will appreciate that the functionality described below may be effectuated by any of numerous digital processing apparatus, servers, or computer systems with suitable hardware encoded with software to construct, digitize, embed, parse, extract, and associate polycode 100 as set forth herein.

In some implementations, polycode publishing server 310, or a device or system having similar functionality, may randomly generate unique 20 numeral octal strings (such as string 300) in batches as demanded by cohort servers, such as cohort server 320, or a device or system having similar functionality, depending upon, for instance, overall system requirements and demand for unique instantiations of polycode 100. Additionally or alternatively, where cohort server 320 is sufficiently equipped, for example, with a suitable processing device, random number generator, or both, polycode publishing server 310 may be omitted or ignored in the FIG. 3 embodiment. In some embodiments, polycode publishing server 310 and cohort server 320 may be integrated into a single server or processing system, either as independent hardware implementations or as virtual processing resources.

String 300 may be assigned or linked to, or coupled or otherwise associated with, one or more metadata files or other data representative of a thing, event, service, or the like. As noted above, polycode 100, in its basic form as represented by string 300, may be deployed or utilized in either or both of tangible medium and electronic display, and may represent or be employed as a proxy for information or data resident on or associated with airline boarding passes, theater or other venue tickets, articles of manufacture, services, access cards or digital keys, encryption keys, bank account data or line items, or other information, avatars, data, or representations of the foregoing. One way to increase the utility of polycode 100 is to associate or otherwise to tag string 300 as connected to, associated with, or representative of a metadata file that is itself, in turn, representative of one or more of the foregoing. In the FIG. 3 embodiment, cohort server 320 may assign string 300 to an associated metadata file, though other possibilities are contemplated. For instance, polycode publishing server 310 or some other device or system (possibly a proprietary system ultimately making use of polycode 100) may effectuate the assignment or association.

String 300 may be modified to add positions (i.e., cells) for validation values as indicated at FIG. 4; as illustrated in FIG. 4, this modification may occur in stages, or the three (or more) additional positions depicted in FIG. 4 (reference numerals 401, 402, and 403) may be added substantially simultaneously. As described above with reference to FIG. 3, cohort server 320 may add positions 401-403, or they may be added by polycode publishing server 310 or some other device or system, such as a proprietary system ultimately making use of polycode 100. In some implementations, positions 401-403 may be added by polycode publishing server 310 and the values inserted (as set forth below with reference to FIG. 5) may be unknown to cohort server 320 until it is necessary to read or scan polycode 100.

As indicated in FIG. 5, validation values (reference numerals 501, 502, and 503) may be added to the positions 401-403 that have been inserted into string 300. Validation values 501-503 may be employed as a mechanism to authenticate polycode 100 and to ensure that the relationship between polycode 100 and the metadata to which it is associated is not misinterpreted by a reader device or other external apparatus or system. As noted above, it may be desirable in some situations to insert values 501-503 at polycode publishing server 310 without interaction with cohort server 320. In the FIG. 5 embodiment using an octal code, value 501 is selected to be the second value in the sequence plus 4 (i.e., 5+4=1 in an octal representation (5+4 mod 8=1)), value 502 is selected to be the seventh value in the sequence plus 1 (i.e., 6+1=7 in an octal representation), and the value 503 is selected to be the fifteenth value in the sequence plus 5 (i.e., 6+5=3 in an octal representation). Those of skill in the art will appreciate that other alternatives are possible. In particular, the location(s) (within string 300) of additional positions 401-403 and the values 501-503 inserted are each susceptible of numerous variations; the embodiment illustrated in FIGS. 4 and 5 is provided by way of example only, and not by way of limitation. The foregoing operations may be managed by polycode publishing server 310, either individually or in cooperation with another data processing system capable of providing random numbers or sequences of numbers with respect to locations of additional positions 401-403, inserted values 501-503, or both. Alternatively, the operations depicted in FIGS. 4 and 5 may be executed by cohort server 320, such that polycode publishing server 310 only provides string 300, and then does not participate in subsequent construction of polycode 100.

Figure 6:
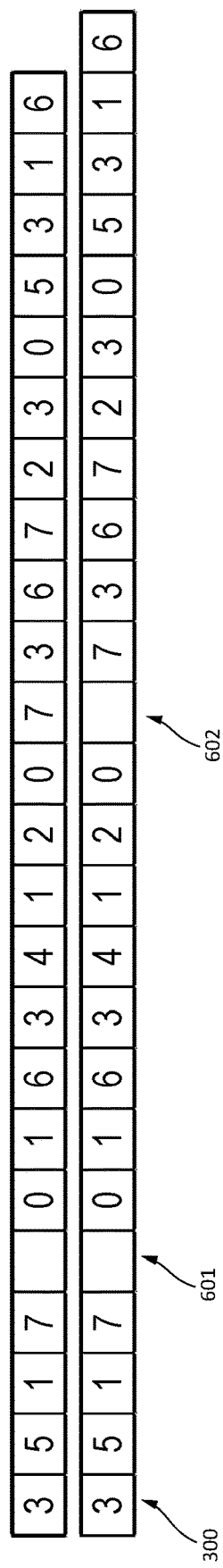
FIG. 6 is a diagram illustrating the string of FIG. 5 with positions added for orientation cells.
Figure 7:
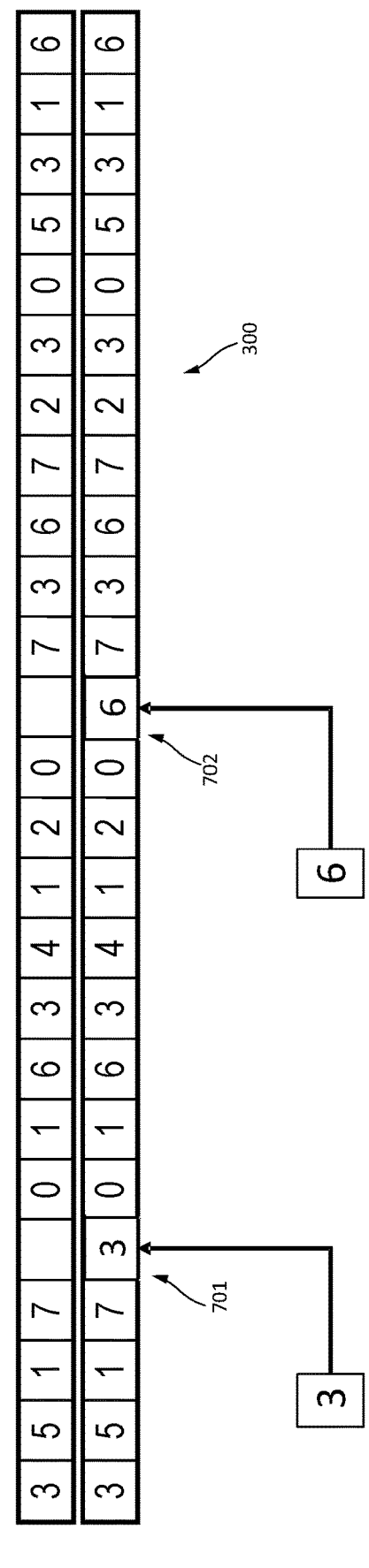
FIG. 7 is a diagram illustrating the string of FIG. 6 with values added for the orientation cells.

Similar to FIGS. 4 and 5, FIG. 6 is a diagram illustrating the string of FIG. 5 with positions added for orientation cells, and FIG. 7 is a diagram illustrating the string of FIG. 6 with values added for the orientation cells.

String 300 may be modified to add positions (i.e., cells) for orientation values as indicated at FIG. 6; as illustrated in FIG. 6, this modification may occur in stages, or the two (or more) additional positions depicted in FIG. 6 (reference numerals 601 and 602) may be added substantially simultaneously. As described above with reference to FIG. 3, cohort server 320 may add positions 601 and 602, or they may be added by polycode publishing server 310 or some other device or system, such as a proprietary system ultimately making use of polycode 100. In some implementations, positions 601 and 602 may be added by polycode publishing server 310 and the values inserted (as set forth below with reference to FIG. 6) may be known to cohort server 320 such that a reader or scanning device may determine proper orientation of polycode 100 upon scanning. For example, positions 601 and 602, as well as values therefor as described below, may be preloaded into software at cohort server 320 or some other suitable apparatus configured and operative to read polycode 100, such that the orientation of polycode 100 in two dimensions may be readily determined. In that regard, it may be useful to use more than two orientation cells, e.g., at more than two locations such as 601 and 602, in some implementations, though even a single orientation cell may be sufficient for most applications. As with the addition of validation values, the operations depicted in FIGS. 6 and 7 may be executed by cohort server 320 independent of any interaction with polycode publishing server 310.

As indicated in FIG. 7, orientation values (reference numerals 701 and 702) may be added to the positions 601 and 602 that have been inserted into string 300. Orientation values 701 and 702 may be employed as a mechanism to orient polycode 100 in two-dimensional space and to ensure that a reader device or other external scanning apparatus or system may properly determine how to read polycode 100. Specifically, information regarding locations 601 and 602 of orientation values 701 and 702 relative to code cells in polycode 100 may enable a reader or scanning device to determine how to begin, and how to proceed, reading code cells in polycode 100 irrespective of the orientation of the reader or scanning device relative to polycode 100. Those of skill in the art will appreciate that this mechanism is similar in some respects to QR codes, except that with respect to polycode 100, orientation values 701 and 702 are visually indistinguishable from code cells, making polycode 100 more secure than conventional technologies.

As noted above, it may be desirable in some situations to insert values 501-503 at polycode publishing server 310 without interaction with cohort server 320; conversely, in FIGS. 6 and 7, it may be desirable in some situations to insert values 701 and 702 in such a manner that a reader or scanning apparatus (and cohort server 320) may determine locations 601 and 602 and values 701 and 702 such that polycode 100 may be properly read. Specifically, it may be desirable that a reader apparatus know, a priori, or at least be capable of ascertaining, the locations 601 and 602 of orientation values 701 and 702. As noted above, a single orientation value (say, 701, for instance) may suffice in many applications, as its position in two-dimensional space may be determined as polycode 100 of known dimensions is read. Alternatively, it may be desirable to use more than two locations 601 and 602 for more than two orientation values.

In the FIG. 7 embodiment using an octal code, random or pseudorandom values 701 and 702 may be selected for locations 601 and 602 (in this case, 3 and 6, respectively), though other alternatives are possible and may be suitable for different applications and situations. In particular, the location of additional positions 601 and 602 and the values 701 and 702 inserted are each susceptible of numerous variations; the embodiment illustrated in FIGS. 6 and 7 is provided by way of example only, and not by way of limitation. The foregoing operations may be managed by cohort server 320, either individually, or in cooperation with another data processing system (such as polycode publishing server 310) capable of providing random numbers or sequences of numbers with respect to locations of additional positions 601 and 602, inserted values 701 and 702, or both. In operation, as long as cohort server 320 or an appropriate reader or scanning apparatus is suitably apprised as to locations 601 and 602 and values 701 and 702, proper reading of polycode 100 may be enabled.

FIG. 8 is a diagram illustrating one embodiment of translating octal values to binary values and translating those binary values to pure chroma values, and FIG. 9 is a diagram illustrating one embodiment of translating the pure chroma values in FIG. 8 to poly-chromatic (or mixed-chroma) values. As indicated in FIG. 8, poly-digital values may be mapped to binary values in which each binary digit has an assigned pure chroma value. In particular, FIG. 8 illustrates, from left to right, binary representations of the numerals 3, 4, 1, 2, and 0; each instance of the value 1 (reference numeral 801) is represented by a pure chroma color "red," each instance of the value 2 (reference numeral 802) is represented by a pure chroma color "green," and each instance of the value 4 (reference numeral 804) is represented by a pure chroma color "blue." It is noted that the foregoing mapping is provided by way of example only, and that various alternative mappings are contemplated and may be implemented without undue experimentation.

For example, FIG. 9 illustrates that the value of 3 (a combination of 1 and 2) maps to "yellow," the value of 4 maps to "blue," the value of 1 maps to "red," the value of 2 maps to "green," and the value of 0 maps to "black," though the present disclosure is susceptible of many variations. A red, green, and blue (RGB) color paradigm may be substituted by the cyan, magenta, yellow, and black (CMYK) color paradigm, for instance, or a combination may be used. In particular, in implementations using more than an octal base for string 300, different or more complex mappings may be appropriate such that each integer in string 300 maps to a unique color or other representation. In that regard, mappings using images or alpha-numeric representations are also contemplated, though a poly-chromatic scheme may be suitable for most applications. It is noted that most display and scanning apparatus are capable of distinguishing many more color variations than the human eye can perceive, and so the mapping of an individual, discrete color for each discrete numeral in string 300 of polycode 100 may be influenced by or effectuated as a function of, for example, code complexity, the nature or operational characteristics of the reader or scanning device intended to be deployed, the base (trinary, octal, decimal, hexadecimal, etc.) used for the numerals in string 300, the color paradigm (RGB, CMYK, etc.) used or preferred, or a combination of these and other factors.

FIG. 10 is a diagram illustrating one embodiment of creating a two-dimensional polycode from a string of mixed-chroma values. As indicated in FIG. 10, coded mixed-chroma values may be arranged into cell matrix 101 representing polycode 100. It is noted that the orientation of polycode 100 matrix 101 is different than that illustrated in FIG. 2. In FIG. 10, where y=0, the polychromatic displays for x=0, 1, 2, 3, 4 are, respectively: yellow; magenta; red; white; and yellow. Similarly, where y=1, the polychromatic displays for x=0, 1, 2, 3, 4 are, respectively: black; red; cyan; yellow; and blue. In the illustrative example, therefore, polycode 100 has been arranged in the form of matrix 101 from string 300 in a raster pattern, starting from the left of string 300 (and moving left to right) and beginning at the top left of matrix 101 (and moving left to right, then down). A spiral pattern, a snaking pattern, or alternative direction may also be used as a design choice.

Non-code cells, such as orientation cell values 701 and 702 and validation cell values 501-503, are illustrated in line (e.g., in string 300) as well as in the context of matrix 101 for clarity. Known locations of non-code cells and knowledge of the pattern used to construct matrix 101 are sufficient to identify non-code cells interspersed amongst code cells in matrix 101. As noted above, and as illustrated in FIG. 10, non-code cells may be visually indistinguishable from other cells in matrix 101, making polycode 100 difficult to falsify, hack, or otherwise to compromise. On the other hand, where a reader or scanning apparatus is suitably apprised of locations of orientation cells, such as represented by values 701 and 702, then such a reader may properly read polycode 100 based at least in part upon the location of values 701 and 702 in matrix 101. As noted above, a single such orientation cell may be sufficient for this purpose, though more than one may also be desirable in some circumstances. For instance, knowledge of the raster pattern in FIG. 10 and the fact that value 701 represents a non-code orientation cell in string 300 may be sufficient to ascertain that polycode 100 should be read from left to right and top to bottom, starting at the top left of matrix 101. A reader or scanning device may read matrix 101 accordingly, and retrieve polycode 100 in the proper sequence such that string 300 may be reconstructed for subsequent processing. Additionally, as noted above, validation cell values 501-503 may be employed by a reader or scanning device, or by an apparatus or system receiving polycode 100 from such a device, to authenticate polycode 100 and to ensure that the relationship between polycode 100 and the metadata to which it is associated is not misinterpreted, corrupted, or otherwise not useful during subsequent retrieval, processing, or both.

Based upon the foregoing, it will be appreciated that in accordance with one embodiment, a polycode data structure may comprise or be embodied in a two-dimensional, cryptographic, poly-chromatic, poly-digital code generally comprising: a plurality of discrete code cells arranged in a two-dimensional matrix, each of the plurality of code cells displaying a combination of zero or more pure chromatic inputs representing an encoded integer, wherein the number of possible combinations of pure chromatic inputs is equal to the number of possible integer values such that a discrete combination of pure chromatic inputs is unique to a discrete integer that is used in the polycode. In that regard, the number of combinations of pure chromatic inputs (e.g., combinations of RBG, CMYK, or a combination or variation of those) may be influenced by or may be a function of the base used for the integers in the code; for example, where an octal code is used, eight combinations of pure chromatic inputs may be employed, where a decimal code is used, ten combinations of pure chromatic inputs may be employed, and so forth. As noted above, typical display, printer, and imaging apparatus are capable of outputting or observing many more combinations of chromatic inputs than are perceivable by the human eye, and so the number of integers used for polycode 100 is not limited by the number of possible combinations of chromatic inputs or colors.

In some implementations, the polycode includes validation cells, orientation cells, or both; as noted above, the validation cells and orientation cells are (individually and collectively) referred to as non-code cells, as they do not represent values in the string of integers being encoded, but rather provide authentication and physical orientation information, respectively, to facilitate code validation and reader orientation functionality. As indicated in FIG. 10, non-code cells may be visually indistinguishable from code cells to the human eye, and may only be identified (e.g., by a reader or scanning device) with knowledge (a priori or otherwise) of the manner in which the original code string (reference numeral 300 in FIG. 3) has been modified to include non-code cells as set forth above with reference to FIGS. 4 and 6.

Figure 11:
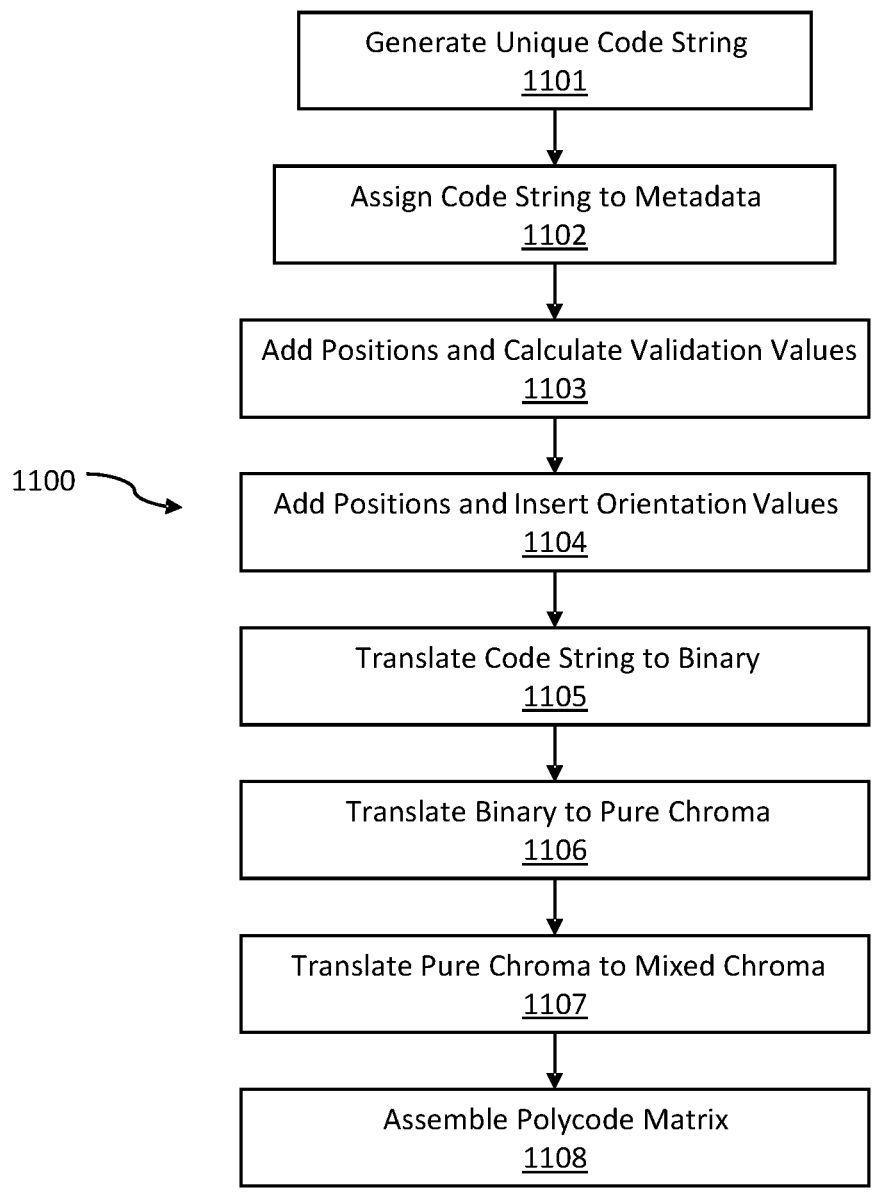
FIG. 11 is a flow diagram illustrating aspects of one embodiment of a method of constructing a polycode data structure.

FIG. 11 is a flow diagram illustrating aspects of one embodiment of a method of constructing a polycode data structure. Initially, a method 1100 in accordance with the disclosed subject matter may begin with a request (not illustrated in FIG. 11) for generation of a polycode 100. As noted above, such a request may be from cohort server 320 or some other system or device (not illustrated in FIG. 3); additionally or alternatively, polycode publishing server 310 may generate polycode 100 unbidden by any external entity and transmit same responsive to internal processing or instruction sets, for example, or store same for subsequent use. In any event, a unique code string may be generated as indicated at block 1101.

An example of such a code string is illustrated at reference numeral 300 in FIG. 3, though other types of strings are contemplated. For instance, string 300 uses an octal base, using a specific numeral (between 0 and 7, for instance) for each position in the string, but trinary, decimal, hexadecimal, and other bases are readily implemented; in the case of a hexadecimal code, for instance, sixteen numerals or symbols (0-9 and A-E) may be used for the code, as opposed to a decimal code where only ten (numerals 0-9) may be sufficient. At block 1101, the unique code string may be generated by randomly or pseudo-randomly selecting a series of numerals, alpha-numeric characters, or other symbols, given the constraints of the base selected for the code. It will be appreciated that any of a variety of random or pseudo-random number generators or encryption engines may be suitable for this task, and that the disclosed subject matter is not intended to be limited by any particular mechanism employed to generate the string at block 1101.

Specific or predetermined metadata or other files may be assigned to or associated with the unique code string as indicated at block 1102. In a cryptographic context, the operation at block 1102 may couple metadata (or the data they represent) to the unique code string such that the metadata themselves need not be transmitted or otherwise exposed in a digital transaction. In that regard, the unique code string that is generated (at block 1101) and associated with metadata (at block 1102) may be substituted, or used as a proxy, for the associated metadata themselves, and in turn, the data files or other information those metadata represent or signify; in the foregoing manner, associated metadata may remain undisclosed and, in fact, irrelevant, in digital interactions, electronic commerce transactions, and other typical computer-enabled or cyber activities. Additionally or alternatively, the association at block 1102 may simply couple or associate the unique code string with metadata attendant to or representative of a particular good or service in much the same manner as a typical barcode or QR code. The association at block 1102 may be effectuated at cohort server 320, for example, or at some other system or device requesting polycode 100 for use in connection with a particular application as set forth above.

Method 1100 may next add positions in the code string and calculate validation values to be added in those positions (i.e., validation cells) as indicated at block 1103. In the embodiment described above with reference to FIGS. 4 and 5, such positions and values may be added, for example, randomly, in accordance with a predetermined or dynamically adjusted scheme or paradigm, or a combination of both. In one implementation, for example, the position of a validation cell in the unique code string may be selected randomly or pseudo-randomly, while the value for insertion into that validation cell may be selected in accordance with the position or with a predetermined rule set. Alternatively, the position of a validation cell in the unique code string may be selected in accordance with a predetermined rule set (for instance, based upon the base or length of the code), whereas the value for insertion into that cell may be selected randomly or pseudo-randomly. It will be appreciated that the operation depicted at block 1103 and described above with reference to FIGS. 4 and 5 may be susceptible of numerous variations within the scope and contemplation of the present disclosure.

As with the association at block 1102, the operations depicted at block 1103 may be effectuated at cohort server 320 or at some other system or device requesting polycode 100 as set forth above. In use of polycode 100, validation cell values may be used to authenticate polycode 100, the metadata with which it is associated, or both. Specifically, validation values may be employed to ensure integrity of polycode 100 in much the same way as hashing functions or error correction codes (ECCs) may be used in conventional systems. It will be appreciated that it may be necessary under some circumstances to expose the operations depicted at block 1103 to a reader device or scanner so as to enable the scanner properly to read or otherwise to decipher polycode 100; alternatively, a reader device or scanner may be apprised a priori to a specific validation schema or paradigm (in encrypted form, for example) such that polycode 100 may be read and decoded without exposure of the location (within the unique code string) and values of validation cells to external systems or hack attempts.

Method 1100 may next add positions in the code string and insert orientation values in those positions (i.e., orientation cells) as indicated at block 1104. In the embodiment described above with reference to FIGS. 6 and 7, such positions and values may be added, for example, randomly, in accordance with a predetermined or dynamically adjusted scheme or paradigm, or a combination of both. As with the operations depicted at block 1103, the operations depicted at block 1104 may be effectuated in numerous ways that are generally known in the art or developed and operative in accordance with known principles. Specifically, the position of an orientation cell in the unique code string may be selected randomly or pseudo-randomly, while the value for insertion into that orientation cell may be selected in accordance with the position or with a predetermined rule set, or vice versa. The insertion of orientation cells and values at block 1104 may be effectuated at cohort server 320, for example, or at some other system or device requesting polycode 100 for use in connection with a particular application. It may be desirable that a scanner or reader device may be apprised of the particular orientation scheme employed in polycode 100 to enable such a device properly to read polycode 100 in the correct sequence; this operation is described above in more detail with reference to FIGS. 6, 7, and 10.

Each numeral in the unique code string, with non-code cells added, may then be translated into binary as indicated at block 1105; this may be effectuated by any of a variety of translators or digital processing engines that are generally known in the art or developed and operative in accordance with known principles to effectuate base translations. Each binary digit may be assigned a particular pure chroma value as set forth above with reference to FIG. 8, and those pure chroma values may be combined to create a unique mixed-chroma value for every integer in polycode 100 as set forth above with reference to FIG. 9. These operations are depicted at blocks 1106 and 1107 in FIG. 11.

It is noted that the mapping of binary digits to pure chroma values may take many forms, and may not necessarily be consistent from one polycode 100 to the next, though in some implementations it may be desirable to maintain such consistency. In the embodiment described above with reference to FIGS. 8 and 9, for instance, the value 1 in binary (reference numeral 801) is mapped to "red," the value 2 in binary (reference numeral 802) is mapped to "green," the value 4 in binary (reference numeral 804) is mapped to "blue", and the value 0 in binary is mapped to "black." This embodiment is provided by way of example only, and not by way of limitation. Other mappings, such as a variation of the foregoing or those using a CYMK color palette, for instance, are readily devised that may provide the same or similar functionality. During use of polycode 100, the combination of those pure chroma values as set forth with reference to FIG. 9 results in a discrete mixed-chroma value assigned for each discrete integer in the code string 300, including the non-code cells.

A two-dimensional polycode matrix (such as square matrix 101 in FIGS. 2 and 10) may be assembled as indicated at block 1108. It is noted that a polycode matrix may be neither square nor regular in shape, and that the illustrated five-by-five cell square embodiment is only one example of a polycode 100 having utility in accordance with the disclosed subject matter. Specifically, the utility of polycode 100 is not dependent upon any particular shape or configuration of matrix 101 as illustrated and described. In particular, use of the term "matrix" is not intended to imply "square" or any other type of regularity with respect to the shape used to present polycode 100. It will be appreciated that possible shapes of matrix 101 include a circle of rings of cells, a hexagon of triangular cells, a snowflake-shaped arrangement of diamond-shaped cells, etc.; any shape with multiple lines of symmetry will have utility as illustrated and described herein. In that regard, matrix 101 may be implemented as a regular polygon, i.e., a polygon that is equiangular and equilateral, though other alternatives as described above are possible, and may be desirable in some instances.

Further, assembly of matrix 101 may employ a raster pattern, a snaking pattern, a spiral pattern, or some other more complicated mechanism to populate cells in two-dimensions from the unique string (i.e., a one-dimensional representation) of integers used in the code, as well as non-code cell values. Various strategies or methodologies may be employed to assemble the polycode matrix depending, for example, upon the level of security desired, the scale and geometric configuration of the matrix, the base of the code (and thus the number of possible mixed-chroma values), or a combination of these and a variety of other factors.

As noted above, the assembled polycode matrix 101 comprises a plurality of code cells, and optionally, one or more orientation cells and one or more validation cells embedded within or interspersed amongst the code cells in matrix 101. In some implementations, it may not be possible to ascertain the location of non-code cells without knowledge of the operations depicted at blocks 1103, 1104, or both.

To summarize the operations depicted in FIG. 11, particularly in the context of FIGS. 3-10, it will be appreciated that a method of constructing a polycode data structure may generally comprise, in one embodiment: generating a unique code string of integer values using a code base that is greater than a binary base, each integer value representing a code cell; for each code cell: translating the integer value to a binary base to create a binary value having binary digits; translating each binary digit to a pure chroma value based upon a mapping; generating a mixed-chroma value based upon a combination of the pure chroma value for each binary digit; and assigning the mixed-chroma value to the code cell; and assembling the code cells into a two-dimensional matrix wherein each code cell is represented in accordance with the assigning.

It is noted that the arrangement of the blocks and the order of operations depicted in FIG. 11 are not intended to exclude other alternatives or options. For example, the operations depicted at blocks 1103 and 1104 may be reversed in order, or they may be made to occur substantially simultaneously in some implementations. Further, one or more of these operations may occur substantially simultaneously with the operation depicted at block 1101 in instances where it is desirable for the same server or apparatus (such as polycode publication server 310, for example) that creates the unique code string 300 to insert place-holders or values within the string for non-code cells. Those of skill in the art will appreciate that the foregoing subject matter is susceptible of various design choices that may influence the order or arrangement of the operations depicted in FIG. 11.

Figure 12:
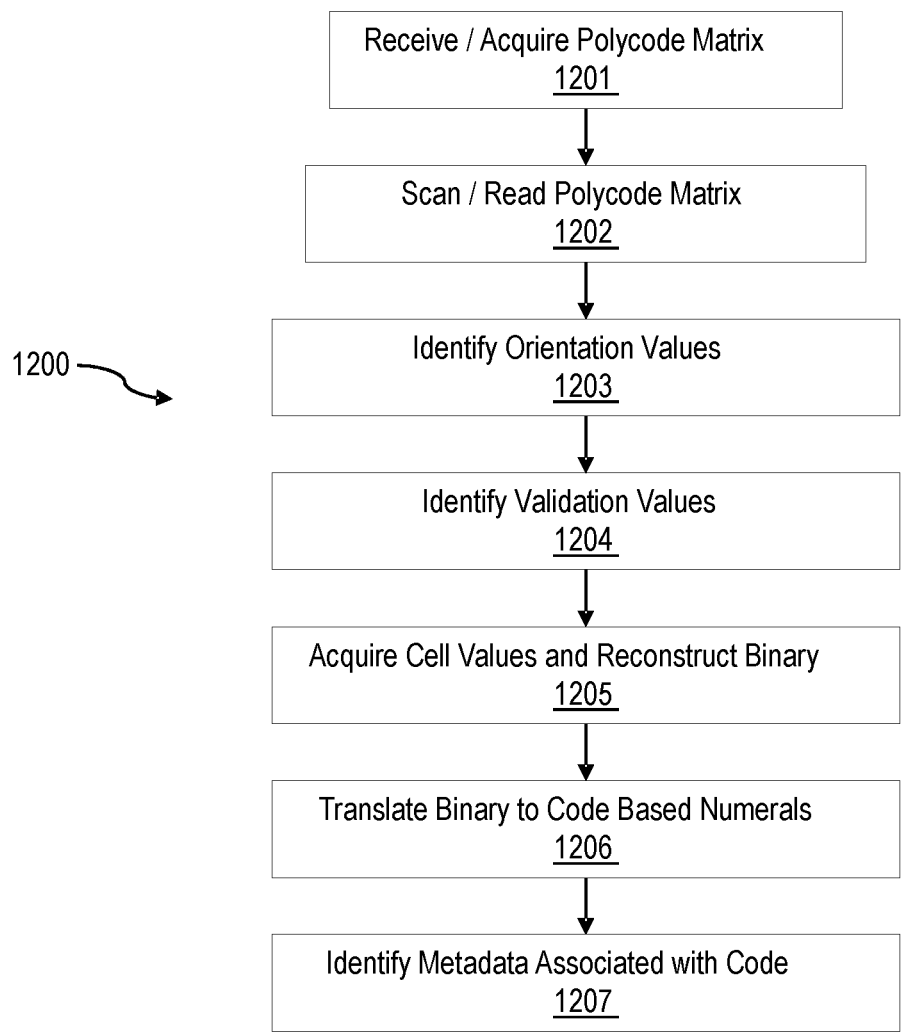
FIG. 12 is a flow diagram illustrating aspects of one embodiment of a method of interpreting a polycode data structure.

FIG. 12 is a flow diagram illustrating aspects of one embodiment of a method of interpreting a polycode data structure. Method 1200 is intended to complement the method illustrated in FIG. 11, though it is executed to interpret polycode 100 rather than to construct it. In accordance with one embodiment, a method of interpreting polycode (reference numeral 1200) may generally begin by receiving or acquiring a polycode matrix 101 as indicated at block 1201. The term "receiving" and "acquiring" in this context are intended to be interpreted broadly to encompass such actions or steps as viewing, detecting, imaging, optically acquiring, and the like. Specifically, block 1201 indicates that matrix 101 may be detected by a suitable detection apparatus such as a polychromatic scanner, a color still or video camera, or optical or other detection technologies that are capable of observing or detecting electromagnetic energy in the portion of the spectrum that includes the mixed-chroma values used by polycode 100. Additionally, the reader or detection apparatus may provide, transmit, or otherwise deliver data representative of the matrix 101 to a processing device, which, in this context, may also be considered to have received or acquired the matrix 101 as indicated at block 1201.

Method 1200 may continue by scanning or reading the polycode matrix 101 as indicated at block 1202. In this context, the terms "scanning" and "receiving" are intended, again, to be interpreted broadly to encompass such actions or steps as viewing, detecting, imaging, and optically acquiring, as well as parsing, interpreting, distinguishing individual cells, and obtaining data (such as mixed-chroma values) for such distinguished individual cells. In that regard, those of skill in the art will appreciate that the operations depicted in blocks 1201 and 102 may occur substantially simultaneously, i.e., the perception, reception, or acquisition of matrix 101 may coincide with or occur substantially simultaneously with the scanning, reading, parsing, or interpretation thereof.

Non-code cells and their values may be identified as indicated at blocks 1203 and 1204. Specifically, orientation cells may be identified at block 1203, and validation cells may be identified at block 1204; in some instances, these operations may occur substantially simultaneously, but in some embodiments, it may be desirable to execute block 1203 first such that an orientation of matrix 101 relative to the reader or scanning device is known to facilitate subsequent operations. As noted above, it may be desirable that the server, processing engine, or other entity responsible for constructing matrix 101 (such as cohort server 310, for instance) provide information to a recipient device to assist with the operations depicted at blocks 1203 and 1204. For example, knowledge of construction of the code (and of matrix 101, in particular) as described above with reference to FIGS. 3-7 is sufficient to identify all non-code cells in matrix 101. This information may be received from the entity responsible for constructing matrix 101 in the first instance; alternatively, where matrix 101 is constructed in accordance with a particular rule set or predetermined paradigm, it may not be necessary to transmit such information to a recipient device, provided that the recipient device is pre-coded or otherwise knowledgeable about the structure of matrix 101 (and thus the relative positions of non-code cells, their values, or both).

In accordance with the operations at blocks 1203 and 1204, the proper orientation of matrix 101 (relative to an axis of a reader or scanning device, for instance) may be determined and the integrity of polycode 100 itself may be validated. Upon successful orientation and validation, code cell values may be acquired (in a proper sequence) such that a binary string representative of integers in the polycode may be reconstructed as indicated at block 1205. In the illustrated embodiment, the binary string (comprising binary digits) for each particular cell in polycode 100 may be reconstructed based upon detection, by the reader or scanning device, of a mixed-chroma value, which in turn may be interpreted as a combination of its constituent pure chroma values, each pure chroma value representing a particular binary value as set forth above with reference to FIGS. 8 and 9. In the foregoing manner, a mixed-chroma value for each cell may be interpreted as a combination of zero or more pure chroma values, each of which represents a binary value, such that a binary representation of an integer value for the cell may be computed. It is also noted that an imaging or detection device may view or obtain optical data to detect constituent pure chroma values one value at a time. In such an embodiment, for instance, the imaging or detection device may scan matrix 101 for the presence of red, green, and blue individually, i.e., three independent scans, one for each possible constituent pure chroma values; in the case where polycode 100 employs a CYMK color paradigm, four independent scans or read operations may be conducted. In either case, a combination of zero or more pure chroma values may be determined for each cell, either based upon a deconstruction of a detected or observed mixed-chroma value or based upon individual scanning operations to detect pure chroma values.

For each cell, the binary representation may be translated into a numeral in accordance with the base (trinary, octal, decimal, etc.) used for polycode 100. This operation is depicted at block 1206.

At this point in method 1200, the unique code string (such as 20-digit octal string 300) as it was originally encoded in matrix 101 may be fully reconstructed for all practical purposes, though it may still contain non-code cells, which may be ignored in subsequent processing operations. In some embodiments, method 1200 may then conclude by identifying metadata (or files, data, or other information represented by the metadata) with which the unique code string was associated during creation of polycode 100 in the first instance.

As with FIG. 11, the arrangement of the blocks and the order of operations depicted in FIG. 12 are not intended to exclude other alternatives or options. In addition to the alternatives set forth in detail above, various design choices that may influence the order or arrangement of the operations depicted in FIG. 12 will be readily apparent to those of skill in the art.

Figure 13:
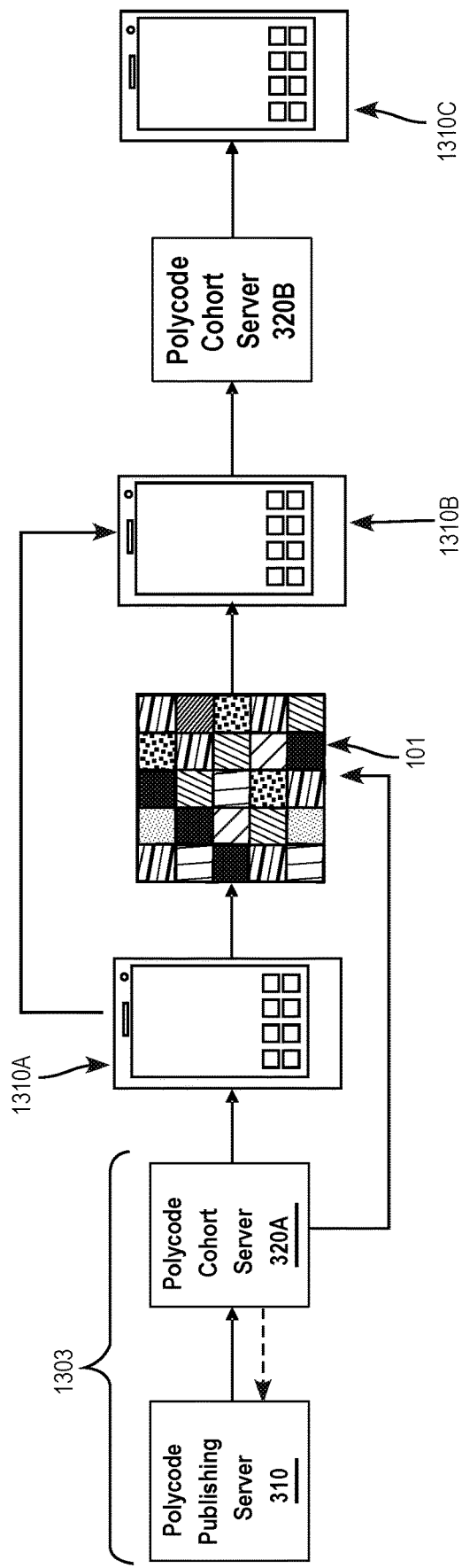
FIG. 13 is a high level diagram illustrating aspects of one system platform employing a polycode data structure.

FIG. 13 is a high level diagram illustrating aspects of one system platform employing a polycode data structure. It is noted that the interaction illustrated at the left of FIG. 13 (reference numeral 1303) is the same interaction illustrated and described above with reference to FIG. 3. An optional request (depicted by the dashed arrow) may be sent from cohort server 320A requesting generation of a polycode 100; responsive to such a request, or based upon other criteria, polycode publishing server 310 may provide to cohort server (such as server 320A) a unique numerical string, each numeral of which is to be employed as a code cell in polycode 100. Subsequently, polycode 100 may be decoded or deciphered by a similarly function cohort server (such as server 320B, for example). The interaction and data flow between and amongst servers 310, 320A, and 320B, on the one hand, and devices 1310A-1310C, on the other hand, are illustrated in simplified form in FIG. 13. It will be appreciated that the communications pathways and network interactions, such as via the Internet, a wide area network (WAN), a local area network (LAN), a wireless fidelity (WiFi) network, a cellular, satellite, or other telephony network, or other telecommunications network or platform have been omitted from FIG. 13 for clarity. Those of skill in the art will appreciate that the disclosed subject matter is not intended to be limited by any particular telecommunications protocol or infrastructure, and that the data communications described herein may be effectuated by any of a number of technologies generally known in the art.

In some embodiments, servers 310, 320A, and 320B may generally be embodied in or comprise any current or future-developed computing system capable of executing one or more instruction sets. For the sake of clarity, the following components are not illustrated in FIG. 13, but for the sake of thoroughness, they are addressed below. Servers 310, 320A, and 320B generally include a processing unit (such as a central processing unit (CPU) or the like as described below), a system memory and a system bus that communicably couples various system components including the system memory to the processing unit. Though individual servers 310, 320A, and 320B may at times be referred to in the singular, this is not intended to limit the embodiments to a single system or computing device, since in certain embodiments, there will be more than one system or other networked computing device (either physical or virtual) involved in operation of any particular server 310, 320A, or 320B. Some examples of commercially available systems operative to provide data processing functionality of servers 310, 320A, and 320B include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit may be any logic processing unit, such as one or more CPUs, microprocessors, digital signal processors (DSPs), application-specific integrated circuits (ASICs), field programmable gate arrays (FPGAs), etc. Generally, the functional blocks of servers 310, 320A, and 320B may be of conventional design and are not described in further detail herein, as they will be understood by those skilled in the relevant art.

Servers 310, 320A, and 320B may also comprise one or more internal non-transitory storage systems or other conventional memory apparatus. Such internal non-transitory storage systems may include, but are not limited to, any current or future-developed persistent storage device such as magnetic storage devices (e.g., hard disc drives), electromagnetic storage devices such as memristors, molecular storage devices, quantum storage devices, electrostatic storage devices such as solid state drives, and the like. Servers 310, 320A, and 320B may also include one or more optional removable non-transitory storage systems such as magnetic storage devices, electromagnetic storage devices, molecular storage devices, quantum storage devices, and electrostatic storage devices (e.g., secure digital ("SD") drives, USB drives, or memory sticks), or the like.

The one or more internal non-transitory storage systems and the one or more optional removable non-transitory storage systems communicate with the processing unit via the system bus via suitable interfaces or device controllers communicably coupled between the devices and the system bus, as is known by those skilled in the relevant art. The non-transitory storage devices generally provide nonvolatile storage of computer-readable instructions, data structures, program modules and other data for operation of servers 310, 320A, and 320B as set forth herein.

Program modules can be stored in the system memory; these may include an operating system, one or more application programs, other programs or modules, device drivers or controllers, and program data. The application programs may include, for example, one or more machine executable instruction sets capable of providing a unique string of numerals in a particular code base (such as string 300, for instance), encoding that string as set forth above with reference to FIG. 11 (in the case of server 310), and reconstructing that string as set forth above with reference to FIG. 12 (in the case of servers 320A and 320B). The application programs may additionally include one or more machine executable instruction sets capable of associating such a string with metadata representing files, data, or other information to be represented by polycode 100, and for assembling polycode 100 into a matrix 101 or other two-dimensional representation.

It will be appreciated that servers 310, 320A, and 320B may also include any number of communications programs and network interface hardware to permit network access and bi-directional data exchange with other systems or components, such as with the various components illustrated in FIG. 13. Specifically, servers 310, 320A, and 320B may operate in an environment using one or more network interfaces communicably to couple to (or engage in data communication or exchange with) one or more remote computers, servers, display devices, and/or other devices (such as devices 1310A-1310C) via one or more communications channels. These logical connections may facilitate any known method of permitting computers to communicate, such as through LANs, WANs, WiFi, Ethernet, etc. Such networking environments are well known in wired and wireless enterprise-wide computer networks, intranets, extranets, and the like.

Devices 1310A-1310C may be embodied in or comprise many of the same components as servers 310, 320A, and 320B. As opposed to servers, however, devices 1310A-1310C may be embodied in desktop computers or workstations, laptop, tablet, or other hand-held computing devices, wireless telephones, and the like. These all include digital processing units, memory (fixed, selectively removable, or both), system buses, network interface hardware and software, device drivers or other controller hardware, and components described above. In addition, devices 1310A-1310C generally comprise, or are communicably coupled with, reading, scanning, or other optical detection components or devices that enable detection, acquisition, scanning, reading or parsing of polycode 100 when presented in the form of matrix 101. In that regard, devices 1310A-1310C may comprise an optical tool such as a camera or scanning device to enable the functionality set forth above with reference to FIG. 12, and to transmit, provide, or otherwise disseminate polycode 100 data to internal system components or to another device for subsequent processing.

Use cases for polycode 100 may be similar to those for which QR codes have utility (digital telecommunications, commercial transactions, encryption applications, links to metadata via a network, etc.), but polycode 100 represents a technological advance in terms of robustness, durability, versatility, security, and cyberspatial utility. For example, polycode 100 may be useful for cryptography applications, particularly because the matrix 101 that is in the public domain is a proxy for the metadata it represents—the metadata themselves need never be exposed.

In some embodiments, polycode 100 may achieve far beyond 75-bit cryptography using only an octal code base. The embodiments illustrated in FIGS. 2 and 10 for instance only employ twenty-five cells (twenty percent of which are non-code cells) encoding 75 bits of data; the power of polycode 100, however, does not necessarily reside in how many bits a particular code string and matrix 101 contains (which is a matter of encoding data), but rather in how difficult it is for an unauthorized user to access the metadata associated with the code string (which is a matter of encryption). It will be appreciated that a polycode 100 data structure and the methodologies described above, employing multiple layers of user-access delineation (shape of matrix 101, orientation scheme, validation scheme, unique combinations of pure chroma values, and the like) render it very difficult to falsify or otherwise to compromise the code string. Further, polycode 100 employs simple data types in cooperation with straightforward binary to polydigital translation (and vice-versa); this enables skilled artisans readily to employ polycode 100 and attendant methodologies as a nonce or other hashing input/output/throughput value in blockchain cryptographic systems or platforms.

Polycode 100 in general, and matrix 101 in particular, may be passively scanned using any conventional device configured and operative to detect electromagnetic energy in the wavelength or frequency band containing the mixed-chroma values displayed or presented in matrix 101; as noted above, these devices are typically capable of distinguishing many more mixed-chroma values than are perceivable by the human eye, making polycode 100 and the methodologies set forth above scalable to many different code bases, even those producing millions of possible integer values. In some embodiments, each cell is read as on/off in each color value (i.e., each individual pure chroma value contributing to a cell's mixed-chroma value may be read or detected individually as set forth above with reference to FIG. 12); other codes (such as QR codes and barcodes), by comparison, are typically designed to be actively scanned by a dedicated reading laser, even if some can be camera-scanned or otherwise read by a generic imaging device.

As described above, the illustrated 5×5 square embodiment of matrix 101 is only a simple example, and is used herein so as not to distract from the broader functionality of polycode 100. Matrix 100 may be in the shape of a triangle, a circle, a rhombus or other parallelogram, an hexagon or octagon, etc.; it will be appreciated that in some of these alternative embodiments, the individual cells in matrix 101 may take on shapes other than the square cells illustrated in the drawing figures.

In another alternative embodiment, symbols may be used in addition to, or in lieu of, colors for a cell. For example, alphanumeric symbols or images (rather than a solid color) may be used in one or more cells. In this manner, the code density may be increased, for instance, if desired or required by a particular application, without necessarily increasing the size or shape of matrix 101. With implementation of orientation cells, for instance, a reader or detection device and decoding algorithms may be able to distinguish between a letter "M" on the one hand and a letter "W" on the other hand; similarly, a distinction may be made between a letter "E" and a numeral "3" (and other similarly ambiguous symbols, the interpretation of which may depend upon orientation) where proper or intended orientation of matrix 101 is known.

Several features and aspects of a system and method have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the present disclosure be considered as limited only by the scope of the appended claims.

What is claimed is:

1. A polycode data structure comprising:
a plurality of discrete code cells arranged in a two-dimensional matrix, wherein the matrix comprising the plurality of discrete code cells represents a unique code string of integer values, each of the plurality of code cells displaying a combination of zero or more pure chromatic inputs representing an encoded integer in the unique code string, wherein a number of possible combinations of pure chromatic inputs is equal to a number of possible integer values such that a discrete combination of pure chromatic inputs is unique to a discrete integer that is used in the polycode.

2. The polycode data structure of claim 1 further comprising a non-code cell positioned in a known location within the matrix.

3. The polycode data structure of claim 2 wherein the non-code cell is an orientation cell that establishes a principal orientation of the matrix.

4. The polycode data structure of claim 2 wherein the non-code cell is a validation cell that establishes that the polycode is not corrupted.

5. The polycode data structure of claim 1 wherein the matrix is a regular polygon.

6. The polycode data structure of claim 1 wherein the matrix is a circle.

7. The polycode data structure of claim 1 wherein the matrix is disposed on an article of manufacture.

8. The polycode data structure of claim 1 where in the matrix is presented on a display.

9. The polycode data structure of claim 1 wherein the matrix is associated with metadata.

10. The polycode data structure of claim 9 where in the metadata are representative of information related to a good or service.

* * * * *